US007888903B2

(12) United States Patent
Son et al.

(10) Patent No.: US 7,888,903 B2

(45) Date of Patent: Feb. 15, 2011

(54) SENSOR SIGNAL ESTIMATOR AND MOTOR CONTROLLER FOR STABILIZATION OF TRACKING ANTENNA

(75) Inventors: Seong-Ho Son, Daejon (KR); Soon-Young Eom, Daejon (KR); Young-Bae Jung, Daejon (KR); Jae-Seung Yun, Daejon (KR); Soon-Ik Jeon, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 462 days.

(21) Appl. No.: 12/095,719

(22) PCT Filed: Nov. 9, 2006

(86) PCT No.: PCT/KR2006/004675

§ 371 (c)(1), (2), (4) Date: May 30, 2008

(87) PCT Pub. No.: WO2007/064093

PCT Pub. Date: Jun. 7, 2007

(65) Prior Publication Data

US 2010/0164425 A1 Jul. 1, 2010

(30) Foreign Application Priority Data

Dec. 1, 2005 (KR) ...................... 10-2005-0116057
Jun. 13, 2006 (KR) ...................... 10-2006-0053204

(51) Int. Cl.
*G01S 5/02* (2010.01)
*H01Q 3/00* (2006.01)

(52) U.S. Cl. ...................... 318/648; 318/634; 318/652; 342/359; 343/757; 343/766

(58) Field of Classification Search ................. 318/611, 318/619, 621, 623, 626, 632, 634, 648, 652; 342/350, 352, 359; 343/757, 763, 766
See application file for complete search history.

(56) References Cited

U.S. PATENT DOCUMENTS 4,100,472 A * 7/1978 Mobley ...................... 318/685
5,351,060 A * 9/1994 Bayne ........................ 343/766

(Continued)

FOREIGN PATENT DOCUMENTS

JP 02-201273 8/1990

(Continued)

*Primary Examiner*—Bentsu Ro
(74) *Attorney, Agent, or Firm*—Rabin & Berdo, P.C.

(57) ABSTRACT

Provided is an apparatus and method for estimating sensor signals to stabilize a posture of a mobile satellite tracking antenna. The apparatus includes: an angular velocity estimating unit for estimating an angular velocity signal by removing an error signal generated from an input angular velocity sensor signal through a first low frequency band filtering operation; and an inclination angle estimating unit for estimating an inclination angle signal by receiving an inclination angle sensor signal, extracting low frequency component of inclination angle signal through performing a second low frequency band filtering operating on the received inclination angle sensor signal, obtaining an inclination angle integrating signal through integrating the estimated angular velocity signal, extracting high frequency component of inclination angle signal through performing a high frequency band filtering operation on the inclination angle integrating signal, and adding the extracted low frequency component and high frequency component of inclination angle signal.

10 Claims, 3 Drawing Sheets

U.S. PATENT DOCUMENTS

| | | | | |
|---|---|---|---|---|
| 6,002,364 | A * | 12/1999 | Kroeger et al. | 342/359 |
| 2003/0083063 | A1 * | 5/2003 | Wang et al. | 455/427 |

FOREIGN PATENT DOCUMENTS

| | | |
|---|---|---|
| JP | 06-177633 | 6/1994 |
| JP | 09-275315 | 10/1997 |
| JP | 10-038992 | 2/1998 |
| KR | 2000-0032093 | 6/2000 |
| KR | 2002-0048496 | 6/2002 |
| KR | 2004-0069685 | 8/2004 |
| KR | 2004-0069686 | 8/2004 |
| KR | 2006-0015474 | 2/2006 |

* cited by examiner

SENSOR SIGNAL ESTIMATOR AND MOTOR CONTROLLER FOR STABILIZATION OF TRACKING ANTENNA

TECHNICAL FIELD

The present invention relates to an apparatus and method for estimating a sensor signal to stabilize a mobile satellite tracking antenna; and more particularly, to an apparatus and method for estimating a sensor signal to stabilize a posture of a mobile satellite tracking antenna in order to control a satellite tracking antenna to accurately direct a target satellite by removing angular velocity error signal and an inclination angle error signal which are generated due to internal or external variations such as electrical noise, temperature variation, and inertia, and by controlling a posture of a satellite tracking antenna using an angular velocity and an inclination angle after removing errors therefrom.

BACKGROUND ART

FIG. 1 is a block diagram illustrating a mobile unit such as a vehicle or vessel with a conventional mobile satellite tracking antenna mounted.

As shown in FIG. 1, conventional mobile satellite tracking antennas 111 and 121 are generally mounted on a mobile unit, for example, a vehicle 110 and a vessel 120. Although the vehicle 110 and the vessel 120 joggle due to mechanical vibration or external impact, the conventional mobile satellite tracking antennas 111 and 121 stably direct a target satellite 101 to receive or to transmit satellite broadcasting.

The mobile satellite tracking antennas 111 and 121 include a sensor unit and a mechanical driving unit. The sensor unit senses the motion of the mobile unit such as the vehicle or the vessel, and the mechanical driving unit drives a satellite antenna to direct a target satellite using sensor signals measured at the sensor unit. In order to accurately drive the satellite antenna to direct the target satellite 101 in spite of the motion of the mobile unit 110 or 120, the information contained in the sensor signal is very important. Also, a motor controlling unit that drives the driving unit according to the information of the sensor signal also performs important functions.

As a sensor technology for a conventional mobile satellite tracking antenna, an electric noise removing technology, an inclination angle sensor technology, and an angular velocity sensor technology were introduced. Hereinafter, the shortcomings of the conventional sensor technologies will be described, Among the conventional sensor technologies, the electric noise removing technology removes the electric noises from sensor signals by passing an inclination angle sensor signal and an angular velocity sensor signal through a low frequency passing filter in a sensor unit.

However, it is very difficult to correct the error of an inclination angle against the motion angle of a mobile unit due to external vibration and impact. In case of the angular velocity sensor signal, a temperature drift phenomenon occurs due to temperature variation that is general characteristic of an angular velocity sensor unit. It is also very difficult to correct the error of the angular velocity sensor signal generated by the temperature drift.

As another conventional technology, a technology for controlling a posture of a satellite tracking antenna was introduced. In this conventional technology, the posture and the location of the satellite antenna are controlled by feeding back an inclination angle only. Or, the speed is controlled by feeding back an angular velocity sensor only. In case of controlling the location and the posture only, the control performance is deteriorated by the error of the inclination angle sensor. Or, in case of controlling the speed only, the control performance is deteriorated by the temperature drift.

In a conventional technology for controlling a posture of a satellite antenna, the posture of the satellite antenna mounted at a mobile unit such as a vessel is controlled by feeding back inclination angular velocity and inclination angular acceleration, thereby improving the responsibility thereof. In the conventional technology, an inclination angle and a first inclination angular velocity are sensed. Also, a second inclination angel velocity is sensed at a base unit. Then, a driver motor is controlled using a PID controller based on the sensor signals. The PID controller controls the driving motor that drives a pedestal by comparing a predetermined target value with the inclination angle and the second inclination angle velocity. That is, the conventional technology for controlling a posture of a satellite antenna was introduced to secure responsibility and predictive to sustain the optimal antennal receiving sensitivity although the mobile unit joggles.

However, these conventional technologies have shortcomings of using a low frequency pass filter for processing sensor signals and have various difficulties to compensate the errors of the sensor signals caused by external impact or vibration.

DISCLOSURE

Technical Problem

It is, therefore, an object of the present invention to provide an apparatus and method for estimating a sensor signal to stabilize a posture of a mobile satellite tracking antenna in order to control the satellite tracking antenna mounted on a mobile unit to accurately direct a target satellite by removing an angular velocity error signal and an inclination angle error signal, which are generated by internal and external variations such as electric noise, temperature variation and inertia.

Technical Solution

In accordance with one aspect of the present invention, there is provided an apparatus for estimating a control signal to stabilize a posture of a mobile satellite tracking antenna including: an angular velocity estimating unit for estimating an angular velocity signal with errors removed by removing an error signal generated by temperature drift from an input angular velocity sensor signal through a first low frequency band filtering operation; and an inclination angle estimating unit for estimating an inclination angle signal by receiving an inclination angle sensor signal, extracting low frequency component of inclination angle signal through performing a second low frequency band filtering operating on the received inclination angle sensor signal, obtaining an inclination angle integrating signal through integrating the estimated angular velocity signal, extracting high frequency component of inclination angle signal through performing a high frequency band filtering operation on the inclination angle integrating signal, and adding the extracted low frequency component and high frequency component of inclination angle signal.

In accordance with another aspect of the present invention, there is provided an apparatus for controlling a posture of a satellite tracking antenna using an apparatus for estimating a control signal to stabilize a posture of a satellite tracking antenna, including: an angular velocity estimating unit for estimating an angular velocity signal by removing an error signal generated by temperature drift of an input angular velocity sensor signal through a first low frequency band filtering operation; an inclination angle estimating unit for estimating an inclination angle signal by receiving an inclination angle sensor signal, extracting low frequency component of inclination angle signal through performing a second low frequency band filtering operating on the received inclination angle sensor signal, obtaining an inclination angle integrating signal through integrating the estimated angular velocity signal, extracting high frequency component of inclination angle signal through performing a high frequency band filtering operation on the inclination angle integrating signal, and adding the extracted low frequency component and high frequency component of inclination angle signal; a motor controlling unit for generating an inclination angle control signal by extracting an inclination angle error signal through subtracting the inclination angle signal estimated at the inclination angle estimating unit from an inclination angle target value, generating an angular velocity control signal by extracting an angular velocity error signal through subtracting the angular velocity signal estimated at the angular velocity estimating unit from an angular velocity target value, and generating a motor control signal by adding the inclination angle control signal and the angular velocity control signal; and a driving motor for controlling a posture of a satellite tracking antenna using the generated motor control signal.

In accordance with another aspect of the present invention, there is provided a method for estimating a control signal to stabilize a posture of a mobile satellite tracking antenna, including the steps of: a) estimating an angular velocity signal by removing an error signal generated by temperature drift from an input angular velocity sensor signal through a first low frequency band filtering operation; and b) estimating an inclination angle signal by receiving an inclination angle sensor signal, extracting low frequency component of inclination angle signal through performing a second low frequency band filtering operating on the received inclination angle sensor signal, obtaining an inclination angle integrating signal through integrating the estimated angular velocity signal, extracting high frequency component of inclination angle signal through performing a high frequency band filtering operation on the inclination angle integrating signal, and adding the extracted low frequency component and high frequency component of inclination angle signal.

Advantageous Effects

An apparatus and method for estimating a sensor signal to stabilize a posture of a mobile satellite tracking antenna according to the present invention removes an angular velocity error signal and an inclination angle error signal, which are generated by external or internal environment variations such as electric noise, temperature variation and inertia. Accordingly, accurate and stable signals can be obtained although the sensor characteristics change according to electric noises, external mechanical vibration and temperature variation.

Furthermore, in the apparatus and method for estimating a sensor signal to stabilize a posture of a mobile satellite tracking antenna according to the present invention, a satellite tracking antenna is controlled based on an angular velocity control signal and an inclination angle control signal after removing the errors therefrom. Accordingly, the apparatus and method for estimating a sensor signal to stabilize a posture of a mobile satellite tracking antenna according to the present invention provides a superior performance of controlling a mobile satellite tracking antenna with fast response and high accuracy. Therefore, a satellite tracking antenna mounted on a mobile unit can be stably and accurately controlled to direct a target satellite.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter.

Figure 1:
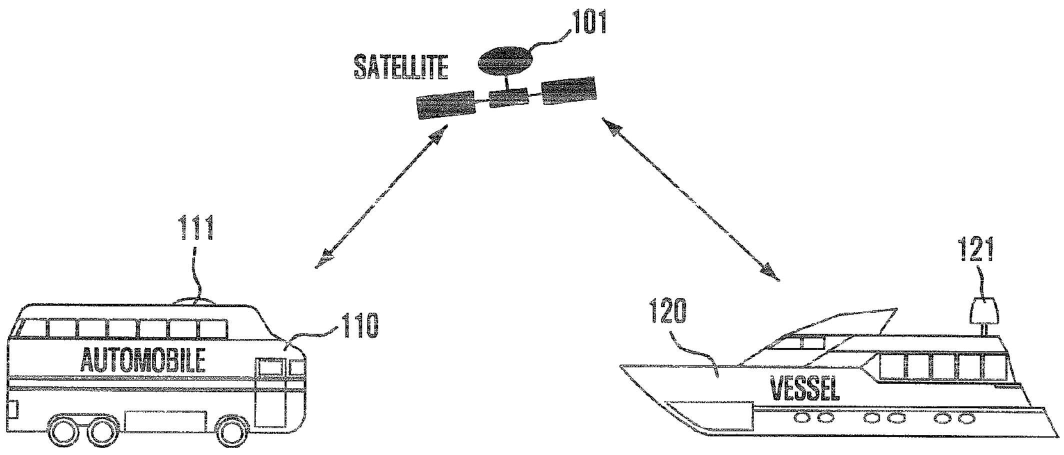
FIG. 1 is a block diagram illustrating a mobile unit such as a vehicle or vessel with a conventional mobile satellite tracking antenna mounted.
Figure 2:
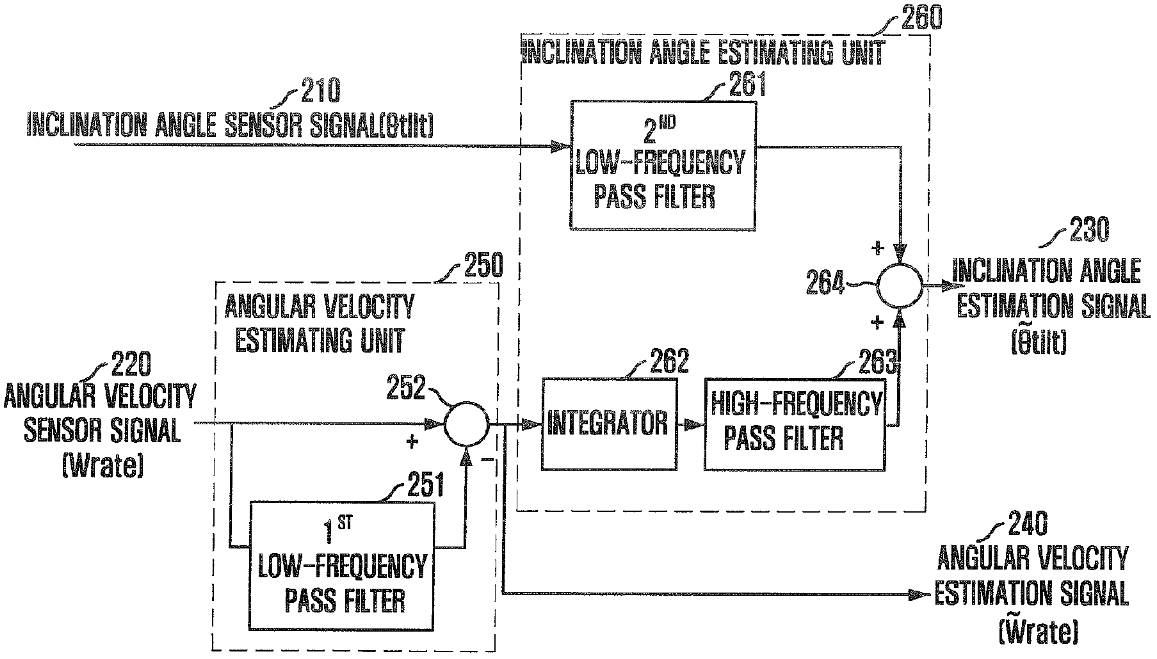
FIG. 2 is a block diagram illustrating an apparatus for estimating a sensor signal to stabilize a posture of a mobile satellite tracking antenna in accordance with an embodiment of the present invention.

FIG. 2 is a block diagram illustrating an apparatus for estimating a sensor signal to stabilize a posture of a mobile satellite tracking antenna in accordance with an embodiment of the present invention.

As shown in FIG. 2, the sensor signal estimating apparatus according to the present embodiment includes an angular velocity estimating unit 250, and an inclination angle estimating unit 260. The angular velocity estimating unit 250 includes a first low frequency pass filter 251, and a subtractor 252. The inclination angle estimating unit 260 includes a second low frequency pass filter 261, an integrator 262, a high frequency pass filter 263, and an adder 264. Hereinafter, the constituent elements of the sensor signal estimating apparatus according to the present embodiment will be described in detail with a sensor signal estimating method thereof.

The angular velocity estimating unit 250 estimates an angular velocity signal and generates an angular velocity estimating signal 240 as the estimating result. In order to estimate the angular velocity signal, the angular velocity estimating unit 250 removes error signals generated by temperature drift using the first low frequency pass filter 251 that extracts DC values generated by the temperature drift of an angular velocity sensor signal 220 from an angular velocity sensor unit. The angular velocity estimating unit 250 outputs the angular velocity estimating signal 240 to the inclination angle estimating unit 260. Hereinafter, the constituent elements of the angular velocity estimating unit 250 will be described.

The first low frequency pass filter 251 performs a low frequency band pass filtering to extract DC value generated by temperature drift of an angular velocity sensor signal 220 from an angular sensor unit extracts, thereby extracting an error signal from the sensor signal 220. After extracting, the first low frequency pass filter 251 outputs the extracted error signal to the subtractor 252.

The subtractor 252 receives the extracted error signal from the first low frequency pass filter 251, and removes the received error signal from the angular sensor signal 220 inputted from the angular velocity sensor unit, thereby estimating the angular velocity estimating signal 240. The angular estimating unit 250 removes the DC value generated by temperature drift and blocks an electric noise signal to input to the inclination angle estimating unit 260. The temperature drift occurs when a reference value for sensing an angular velocity changes depending on temperature variation.

For example, if a reference voltage for measuring an angular velocity is 2.5V, the reference voltage changes depending on an external temperature variation. Although the mobile unit is stationary, the antenna is mis-recognized as the mobile unit is moving in some degrees of velocity due to the reference voltage changes. An example of the temperature drift will be described with reference FIG. 4 in later.

The angular velocity estimating unit 250 removes the electric noise signal using the signal outputted from the first low frequency pass filter 251 at the subtractor 250 so as to block the electric noise signal to input to the inclination angle estimating unit 260.

The inclination angle estimating unit 260 extracts low frequency components from an inclination angle signal 210 by performing second low pass filtering to remove an error signal caused by inertia from the inclination sensor signal 210 from an inclination angle sensor unit.

The inclination angle estimating unit 260 obtains an inclination angular integrating signal by integrating the angular velocity estimating signal 240 from the angular velocity estimating unit 250, and extracts a high frequency component of inclination angle signal by performing a high frequency band filtering on the inclination angular integrating signal. The inclination angle estimating unit 260 estimates an inclination angle signal and outputs an inclination angle estimating signal 230 as an estimating result by adding the low frequency component of inclination angle signal and the high frequency component of inclination angle signal. Hereinafter, the constituent elements of the inclination angle estimating unit 260 will be described in detail.

The second low frequency pass filter 261 performs a second low frequency band filtering to remove an error signal caused by inertia from the inclination sensor signal 210 from the inclination angle sensor unit so as to extract the low frequency component of inclination angle signal. Afterward, the second low frequency pass filter 261 outputs the low frequency component inclination angle signal to the adder 264.

The integrator 262 integrates the angular velocity estimating signal 240 from the angular velocity estimating unit 250, thereby obtaining the inclination angle signal.

The high frequency pass filter 263 performs a high frequency band filtering operation on the inclination angle signal received from the integrator 262 so as to extract the high frequency component of inclination angle signal. Afterward, the high frequency pass filter 263 outputs the extracted high frequency component of inclination angle signal to the adder 264. Herein, the cut-off frequencies of the second low frequency pass filter 263 and the integrating high frequency pass filter 263 are same. If the cut-off frequencies are not same, a predetermined band of the inclination angle signal may be overlapped. As a result, a predetermined band is added or subtracted so an error occurs.

The adder 264 adds the low frequency component of the inclination angle signal extracted from the second low frequency pass filter 261 and the high frequency component of the inclination angle signal extracted from the high frequency pass filter 263, thereby estimating an inclination angle signal.

Hereinafter, a method of estimating a sensor signal to stabilize a posture of a mobile satellite tracking antenna will be described.

The angular velocity estimating unit 250 passes a low frequency band of an angular velocity sensor signal, which is generated by temperature drift, from an angular velocity sensor unit. The angular velocity estimating unit 250 extracts an error signal caused by the temperature drift through low frequency band filtering, and estimates an angular velocity signal by removing the extracted error signal from the angular velocity sensor signal.

The inclination angle estimating unit 260 removes an error signal generated by inertia through low frequency band filtering an inclination angle sensor signal inputted from an inclination angle sensor. The inclination angle estimating unit 260 obtains an inclination angle integrating signal by integrating the angular velocity signal estimated at the angular velocity estimating unit 250, and extracts the high frequency components of the inclinational angle signal through high frequency band filtering the inclinational angle integrating signal. Afterward, the inclination angle estimating unit 260 estimates the inclination angle signal by adding the low frequency components and the high frequency components of the inclination angle signal.

Figure 3:
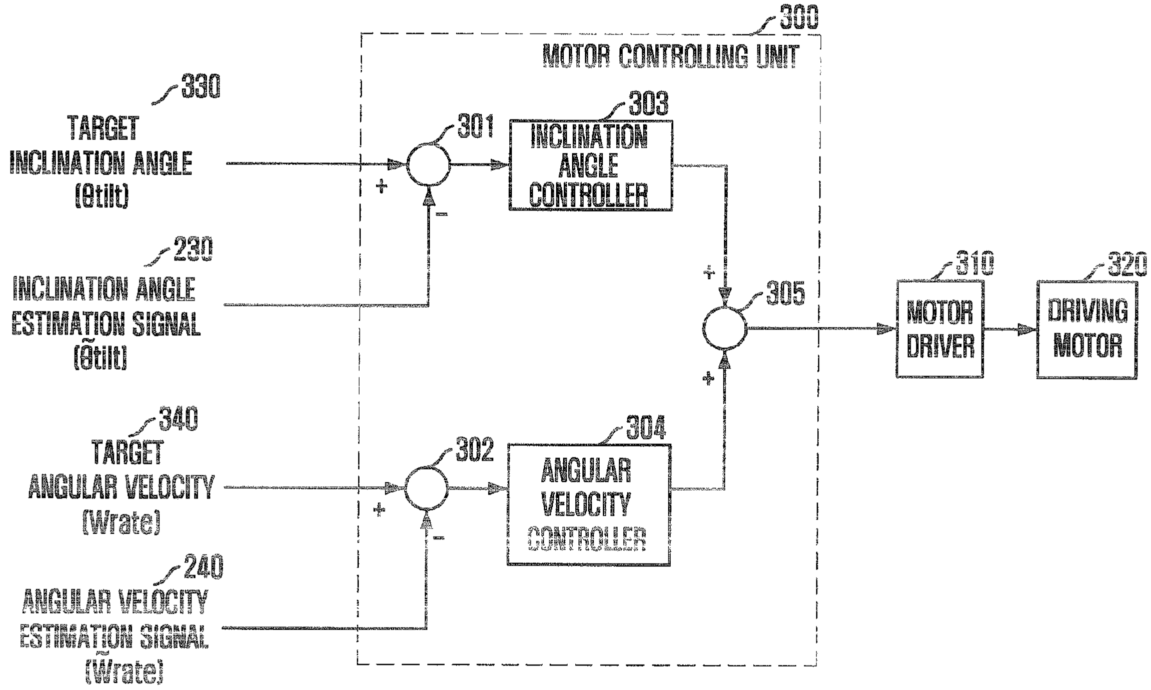
FIG. 3 is an antenna motor controlling apparatus using a sensor unit for correcting a posture of a mobile satellite tracking antenna in accordance with an embodiment of the present invention.

FIG. 3 is an antenna motor controlling apparatus using a sensor unit for correcting a posture of a mobile satellite tracking antenna in accordance with an embodiment of the present invention.

Referring to FIGS. 2 and 3, the antenna motor controlling apparatus according to the present embodiment includes an angular velocity estimating unit 250, an inclination angle estimating unit 260, a motor controlling unit 300, a motor driver 310, and a driving motor 320. Since the angular velocity estimating unit 250 and the inclination angle estimating unit 260 were described with reference to FIG. 2, their descriptions will be omitted. The motor controlling unit 300 includes a first subtractor 301, a second subtractor 302, an inclination angle controller 303, an angular velocity controller 304, and an adder 305. According to motions made by a mobile unit, an inclination angle estimating signal 230 and an angular velocity estimating signal 240 for each axis of a satellite tracking antenna feedbacks to the motor controlling unit 300.

The motor controlling unit 300 extracts an inclination angle error signal by subtracting an inclination angle signal estimated at the inclination angle estimating unit 260 from an inclination angle target value that is inputted for moving an inclination angle. Based on the extracted inclination angle error signal, the motor controlling unit 300 generates an inclination angle control signal.

Then, the motor controlling unit 300 generates a motor control signal by adding the inclination angle control signal and an angular velocity control signal, and obtains an inclination angle and an angular velocity together. An apparatus for controlling a posture of a satellite antenna is controlled by the generated motor control signal.

The driving motor 320 controls the posture of a satellite tracking antenna using the generated motor control signal from the motor controlling unit 300.

Hereinafter, the constituent elements of the motor controlling unit 300 will be described in detail.

The first subtractor 301 subtracts the inclination angle estimating signal 230 from the inclination angle target value 330 and outputs the subtracting result signal to the inclination angle controller 303.

The second subtractor 302 subtracts the angular velocity estimating signal 220 from the angular velocity target value 340, and outputs the subtracting result signal to the angular velocity controller 304. Herein, the inclination angle target value 330 and the angular velocity target value 340 are predetermined values to drive the driving motor 320.

The inclination angle controller 303 generates an inclination angle control signal using the subtracting result signal outputted from the first subtractor 301 to control the motor driver 310. The angular velocity controller 304 generates an angular velocity control signal using the subtracting result signal outputted from the second subtractor 302 to control the motor driver 310. That is, the motor controlling unit 300 reduces the inclination angle error and the angular velocity error using the inclination angle controller 303 and the angular velocity controller 304. In general, a PID controller may be used as the inclination angle controller 303 and the angular velocity controller 304.

The adder 305 adds the inclination angle control signal and the angular velocity control signal outputted from the inclination angle controller 303 and the angular velocity controller 304, and outputs a control signal to the motor driver 306 as the adding result in order to mechanically drive each axis of a satellite tracking antenna.

Meanwhile, the motor driver 310 receives the output signal from the motor controller 300 and drives the driving motor 320 according to the received output signal to mechanically drive each axis of a satellite tracking antenna.

Figure 4:
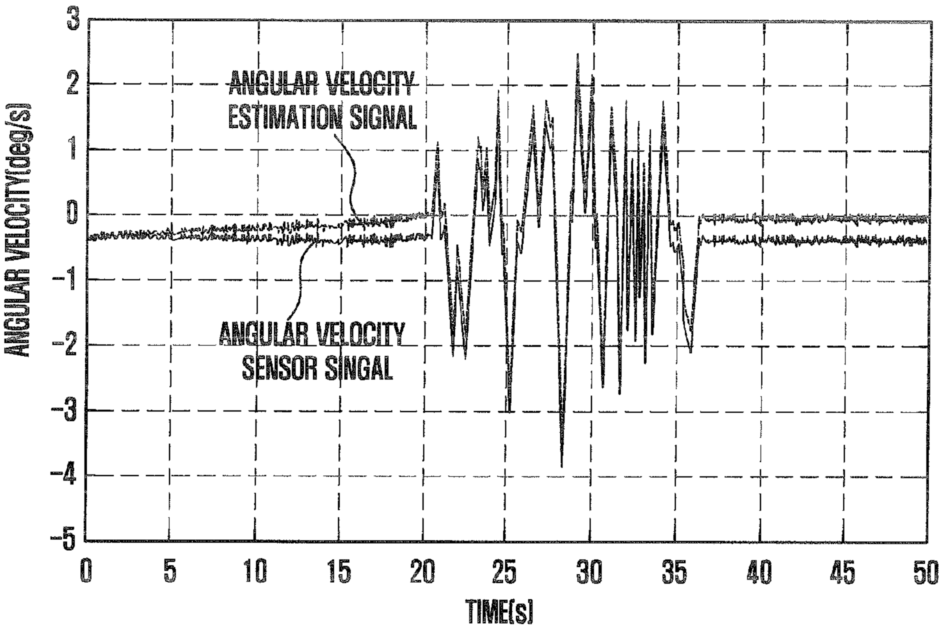
FIG. 4 is a graph comparing an angular velocity sensor signal and an angular velocity estimating signal of FIG. 2 in accordance with an embodiment of the present invention.

FIG. 4 is a graph comparing an angular velocity sensor signal and an angular velocity estimating signal of FIG. 2 in accordance with an embodiment of the present invention.

Referring to FIG. 4, an angular velocity sensor signal 210 is obtained by observing a mobile unit that moves only from the $21^{st}$ second to the $37^{th}$ second using an angular velocity sensor. As shown, the angular velocity sensor signal shows as the mobile unit moves at 0.5 degree/second in the stationary condition of a mobile unit. The 0.5 degree/second error is generated by temperature drift. The temperature drift phenomenon generates errors in an angular velocity sensor signal by the reference value variation of the angular velocity sensor, which changes due to the external temperature variation. As described above, the angular velocity estimating unit 250 gradually compensates the errors generated by the temperature drift by removing the errors from the angular velocity sensor signal 220 using the first low frequency pass filter 251 so as to outputs the error compensated angular velocity estimating signal 240.

Figure 5:
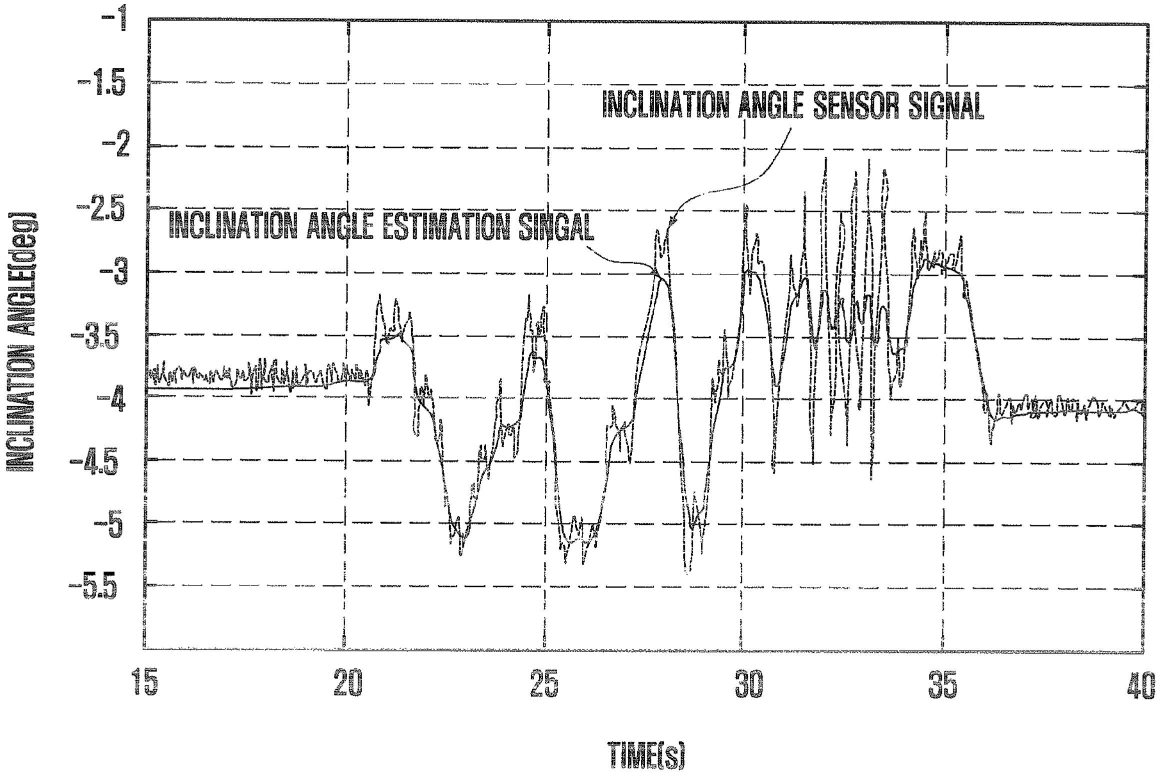
FIG. 5 is a graph comparing an inclination angle sensor signal and an inclination angle estimating signal of FIG. 2 in accordance with an embodiment of the present invention.

FIG. 5 is a graph comparing an inclination angle sensor signal and an inclination angle estimating signal of FIG. 2 in accordance with an embodiment of the present invention.

Referring to FIG. 5, an inclination angle sensor signal 210 is measured by observing a mobile unit that moves only from the $21^{st}$ second to the $37^{th}$ second using an inclination angle sensor. As shown, the errors are generated in the inclination angle sensor signal 210 due to inertia caused by the angular velocity variation in a period from the $21^{st}$ second to the $37^{th}$ second. The errors are generated by the liquid in the inside of an inclination angle sensor which is generally used for measuring the inclination angle. As described above, the inclination angle estimating unit 260 compensates the errors of the angular velocity sensor signal and outputs the inclination angle estimating signal with the errors removed.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. 2005-116057 and 2006-53204, filed with the Korean Intellectual Property Office on Dec. 1, 2005, and Jun. 13, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for estimating a control signal to stabilize a posture of a mobile satellite tracking antenna comprising:

an angular velocity estimating means for estimating an angular velocity signal by removing an error signal generated by temperature drift of an input angular velocity sensor signal through a first low frequency band filtering operation; and an inclination angle estimating means for estimating an inclination angle signal by receiving an inclination angle sensor signal, extracting low frequency component of inclination angle signal through performing a second low frequency band filtering operation on the received inclination angle sensor signal, obtaining an inclination angle integrating signal through integrating the estimated angular velocity signal, extracting high frequency component of inclination angle signal through performing a high frequency band filtering operation on the inclination angle integrating signal, and adding the extracted low frequency component and high frequency component of inclination angle signal.

2. The apparatus as recited in claim 1, wherein the angular velocity estimating means includes:

a first low frequency pass filter for extracting an error signal generated by temperature drift by performing a first low frequency filtering operation on an angular velocity sensor signal inputted from an angular velocity sensor; and a subtracting means for estimating an angular velocity signal by removing the error signal, which is generated by temperature drift, from the angular velocity sensor signal.

3. The apparatus as recited in claim 1, wherein the inclination angle estimating means includes:

a second low frequency pass filter for extracting a low frequency component of an inclination angle signal by removing an error signal generated by inertia through performing a second low frequency band filtering operation on the inclination angle sensor signal inputted from an inclination angle sensor;

an integrating means for obtaining an inclination angle integrating signal by integrating the angular velocity signal estimated at the angular velocity estimating means;

a high frequency pass filter for extracting high frequency component of an inclination angle signal by performing a high frequency band filtering operation on the obtained inclination integrating signal; and an adding means for estimating an inclination angle signal by adding the extracted low frequency component of inclination angle signal and the extracted high frequency component of inclination angle signal.

4. The apparatus as recited in claim 3, wherein a filtering frequency of the second low pass filter is identical to a filtering frequency of the high frequency pass filter.

5. An apparatus for controlling a posture of a satellite tracking antenna using an apparatus for estimating a control signal to stabilize a posture of a satellite tracking antenna, comprising:

an angular velocity estimating means for estimating an angular velocity signal by removing an error signal generated by temperature drift of an input angular velocity sensor signal through a first low frequency band filtering operation;

an inclination angle estimating means for estimating an inclination angle signal by receiving an inclination angle sensor signal, extracting low frequency component of inclination angle signal through performing a second low frequency band filtering operation on the received inclination angle sensor signal, obtaining an inclination angle integrating signal through integrating the estimated angular velocity signal, extracting high frequency component of inclination angle signal through performing a high frequency band filtering operation on the inclination angle integrating signal, and adding the extracted low frequency component and high frequency component of inclination angle signal;

a motor controlling means for generating an inclination angle control signal by extracting an inclination angle error signal through subtracting the inclination angle signal estimated at the inclination angle estimating means from an inclination angle target value, generating an angular velocity control signal by extracting an angular velocity error signal through subtracting the angular velocity signal estimated at the angular velocity estimating means from an angular velocity target value, and generating a motor control signal by adding the inclination angle control signal and the angular velocity control signal; and a driving motor for controlling a posture of a satellite tracking antenna using the generated motor control signal.

6. The apparatus as recited in claim 5, wherein the motor controlling means includes:

a first subtracting means for extracting an inclination angle error signal by subtracting the inclination angle signal estimated at the inclination angle estimating means from an inclination angle target value;

an inclination angle controlling means for generating an inclination angle control signal using the extracted inclination angle error signal;

a second subtracting means for extracting an angular velocity error signal by subtracting the angular velocity signal estimated at the angular velocity estimating means from an angular velocity target value;

an angular velocity controlling means for generating an angular velocity control signal using the extracted angular velocity error signal; and an adding means for generating a motor control signal by adding the generated inclination angle control signal and the angular velocity control signal.

7. A method for estimating a control signal to stabilize a posture of a mobile satellite tracking antenna, comprising the steps of:

a) estimating an angular velocity signal by removing an error signal generated by temperature drift of an input angular velocity sensor signal through a first low frequency band filtering operation; and b) estimating an inclination angle signal by receiving an inclination angle sensor signal, extracting low frequency component of inclination angle signal through performing a second low frequency band filtering operation on the received inclination angle sensor signal, obtaining an inclination angle integrating signal through integrating the estimated angular velocity signal, extracting high frequency component of inclination angle signal through performing a high frequency band filtering operation on the inclination angle integrating signal, and adding the extracted low frequency component and high frequency component of inclination angle signal.

8. The method as recited in claim 7, wherein the step a) includes the steps of:

a-1) extracting an error signal generated by temperature drift by performing a first low frequency filtering operation on an angular velocity sensor signal inputted from an angular velocity sensor unit; and a-2) estimating an angular velocity signal by removing the error signal, which is generated by temperature drift, from the angular velocity sensor signal.

9. The method as recited in claim 7, wherein the step b) includes the steps of:

b-1) extracting a low frequency component of an inclination angle signal by removing an error signal generated by inertia through performing a second low frequency band filtering operation on the inclination angle sensor signal inputted from an inclination angle sensor;

b-2) obtaining an inclination angle integrating signal by integrating the angular velocity signal estimated at the step a);

b-3) extracting high frequency component of an inclination angle signal by performing a high frequency band filtering operation on the obtained inclination integrating signal; and b-4) estimating an inclination angle signal by adding the extracted low frequency component of inclination angle signal and the extracted high frequency component of inclination angle signal.

10. The method as recited in claim 9, wherein a cut-off frequency of the second low pass filter is identical to a cut-off frequency of the high frequency pass filter.

* * * * *